April 24, 1962 W. NEEF 3,031,201
CHUCK
Filed Nov. 17, 1960 3 Sheets-Sheet 1

INVENTOR.
WALTER NEEF
BY
Owen + Owen
ATTORNEYS

April 24, 1962 W. NEEF 3,031,201
CHUCK
Filed Nov. 17, 1960 3 Sheets-Sheet 2

INVENTOR.
WALTER NEEF
BY Owen + Owen
ATTORNEYS

United States Patent Office 3,031,201
Patented Apr. 24, 1962

3,031,201
CHUCK
Walter Neef, Jackson, Mich., assignor to The Toledo Pipe Threading Machine Company, Toledo, Ohio, a corporation of Ohio
Filed Nov. 17, 1960, Ser. No. 69,991
5 Claims. (Cl. 279—114)

This invention relates to a quick-acting chuck for pipe threading machines or the like and more particularly to an improved jaw construction for such a chuck.

A chuck according to the invention includes jaws connected to round supporting blocks which are located in round, radially extending guide passages in a chuck body, this construction being much easier to manufacture than is the usual chuck in which square supporting blocks are employed with square guide passages which must be milled in the chuck body, a time consuming and expensive operation.

The new jaw construction also includes improved pivotal attachments for connecting the jaws and the supporting blocks, which attachments enable the jaws to have a better bite and also are easier to manipulate so that the jaws can be more easily attached to and detached from the supporting blocks for replacement purposes.

The new supporting blocks have conventional grooves in sides thereof to receive a spiral ridge of a scroll plate which drives the supporting blocks and jaws radially inwardly and outwardly in the usual manner when the plate is rotated. However, in the new supporting blocks, the grooves are a sufficient distance from the jaws so as never to be exposed beyond the round passages during the normal operation of the chuck, which thereby eliminates the possibility of dirt and chips being lodged in the grooves and causing jamming.

It is, therefore, a principal object of the invention to provide a quick acting chuck with an improved jaw construction having the advantages outlined above.

Other objects and advantages of the invention will be apparent from the following detailed description of a preferred embodiment thereof, reference being made to the accompanying drawings, in which.

Figure 1:
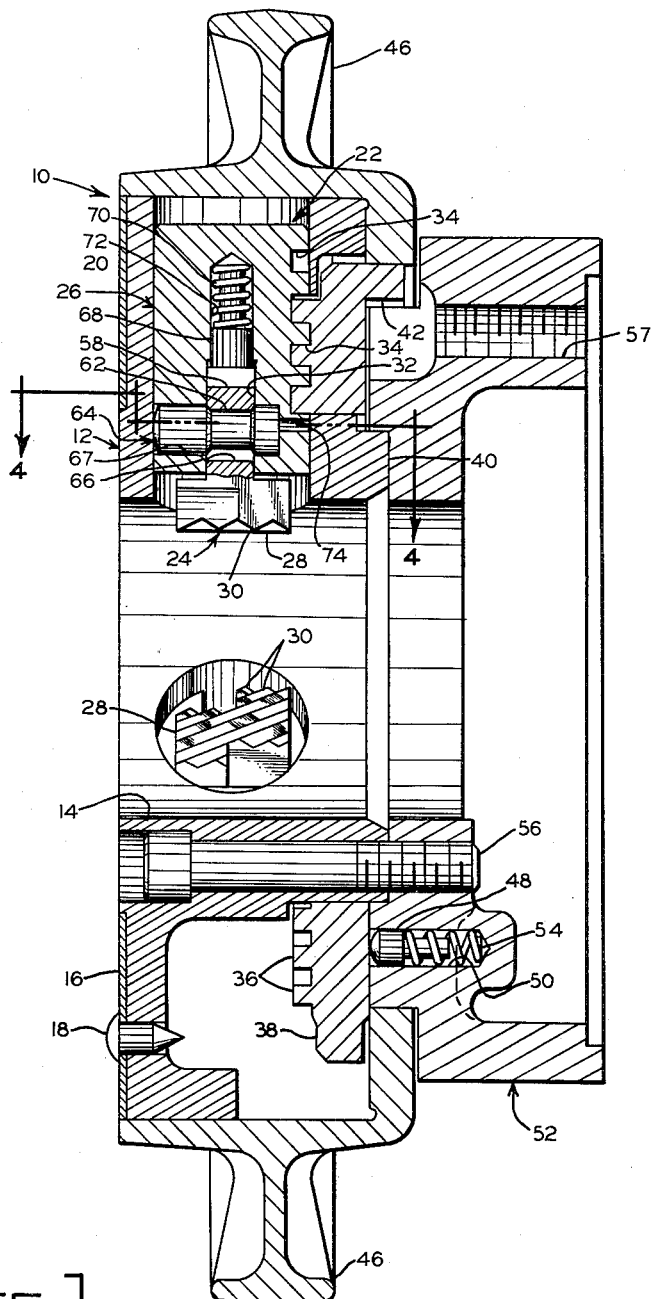
FIG. 1 is a view in vertical cross section of a quick acting chuck embodying the principles of the invention.

Referring to the drawings, and more particularly to FIG. 1, a chuck 10 embodying the principles of the invention includes a chuck body 12 having a center opening 14 through which a pipe or other work piece is placed for clamping engagement therewith. The chuck can then be held stationary while rotating cutters thread the pipe, or vice versa. The body 12 includes a cover plate 16 fastened thereto by pins 18 and three radially-extending round passages 20 which receive three jaw assemblies 22 for sliding engagement therein. The passages 20 are easily formed in the body 12 by a relatively simple drilling operation because of their circular cross section. In conventional quick-acting chucks, the passages for the jaw assemblies are square and must be milled in the chuck body adjacent one face thereof. This is not only time consuming, but, of necessity, the passages are open at the face through which they are milled so that they are subjected to dirt and chips which cause the jaw assemblies to bind in the passages.

The jaw assemblies 22 include jaws 24 connected to supporting and guiding blocks 26 by pivotal connecting means to be discussed later. The jaws 24 include jaw faces 28 which consist of two generally square portions arranged in staggered relationship with diagonal ridges 30 thereon. This particular shape of the jaws has been found to be extremely effective in providing strong bite on the work piece located in the opening 14.

The supporting and guiding blocks 26 are of generally cylindrical shape and have slots 32 extending in depth to approximately half their length in order to receive parts of the jaws 24. The blocks also have a plurality of arcuate grooves 34 in one side thereof which engage a spiral ridge 36 on a scroll plate 38. The grooves 34 are formed well back of the jaw faces 30 so that they are never exposed beyond the passage 20 during normal operation of the chuck. Rotation of the scroll plate 38, which rides on a hub portion 40 of the body 12, causes the supporting and guiding blocks 26 of the jaw assemblies 22 to move inwardly or outwardly in the passages 20 and to engage or disengage work pieces in the opening 14.

The scroll plate 38 has three arcuate projections 42 extending outwardly from the periphery thereof, which projections are located in notches 44 (FIG. 2) of a hand wheel 46. The hand wheel is of conventional design, being rotatably mounted on the periphery of the body 12 and can be rotated by hand in either direction so that the portions forming the notches 44 can engage the projections 42 to rotate the scroll plate 38 and to move the jaw assemblies 22 inwardly or outwardly. By making the peripheral extent of the notches 44 considerably greater than the peripheral extent of the projections 42, the hand wheel 46 can be moved back and forth in repeated motions to impart hammer-like blows to the projections 42 and tighten the jaws 24 more fully than would otherwise be possible. This expedient is conventional and known in the art, however.

The scroll plate 38 is maintained in engagement with the supporting and guiding blocks 26 by means of pins 48 (FIG. 1) which are located in cylindrical recesses 50 of a pressure plate or member 52 and are urged outwardly by springs 54. The pins 48 and the springs 54 thereby keep the cylindrical guide blocks 20 from turning and binding by maintaining pressure on the scroll plate 38. The pressure member 52 is suitably mounted on the hub portion 40 of the body 12 by means of machine screws 56 and is connected to a pipe threading machine or other apparatus with which the chuck 10 is employed by screws, bolts, or other suitable fasteners held in tapped holes 57.

Figure 2:
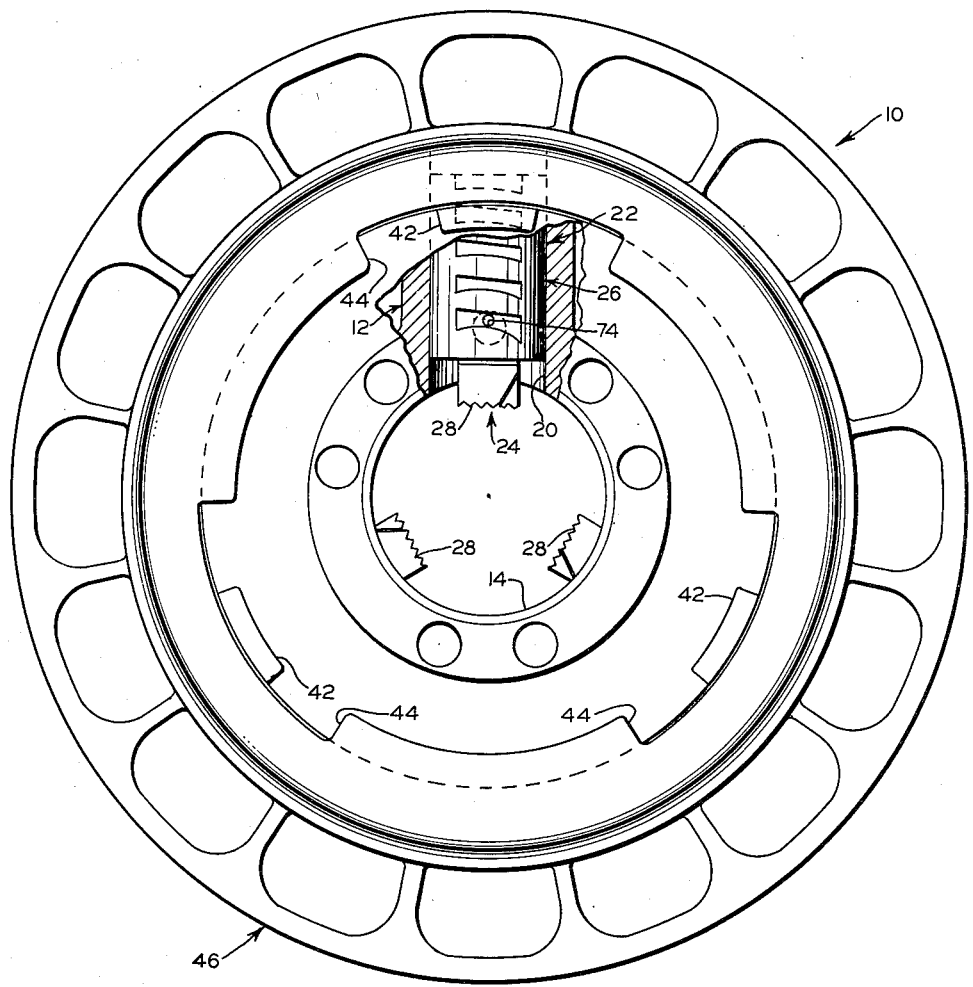
FIG. 2 is a rear view in elevation of the chuck of FIG. 1, with a portion removed and with parts broken away and parts in cross section.
Figure 4:
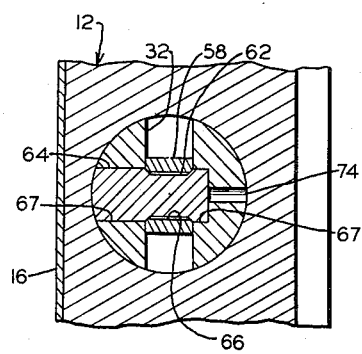
FIG. 4 is a view in cross section taken along the line 4—4 of FIG. 1.
Figure 3:
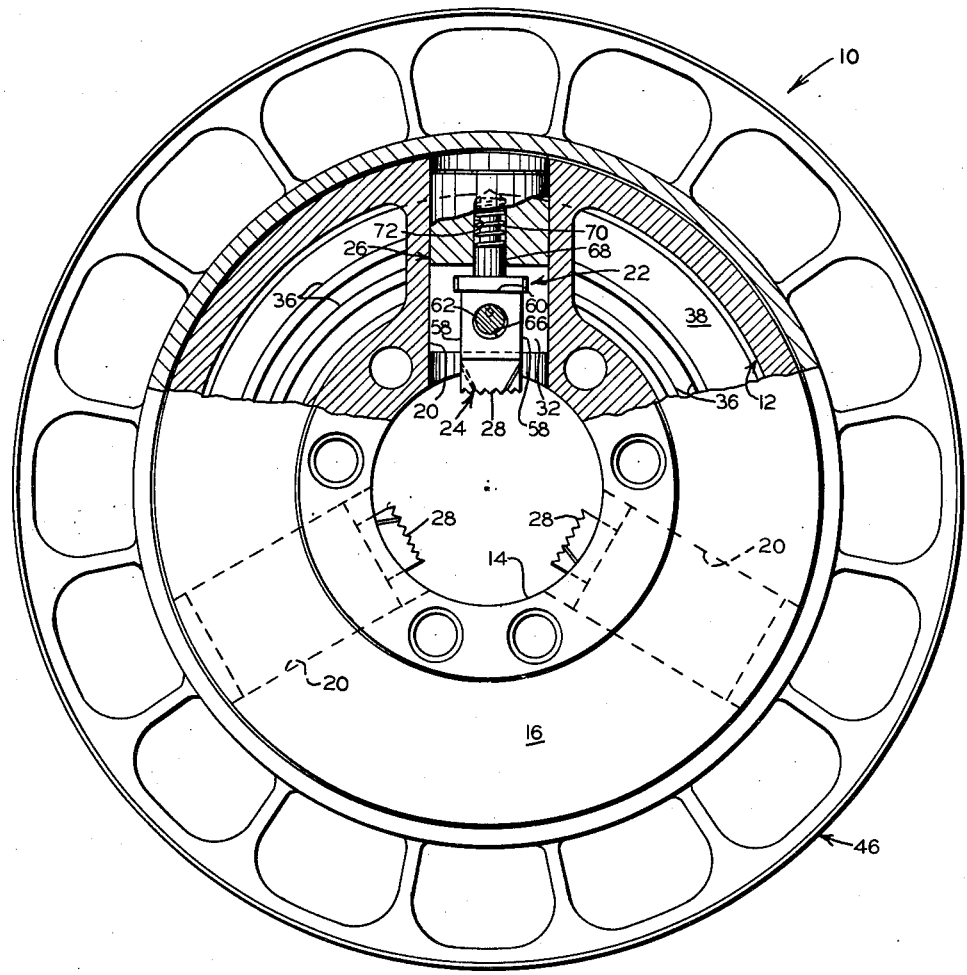
FIG. 3 is a view similar to FIG. 2 but with additional parts broken away and with additional parts in cross section.

Referring now more particularly to the construction of the jaw assemblies 22, the supporting and guiding blocks 26, and the jaws 24, each of the jaws 24 has a tab 58 extending rearwardly therefrom into the slot 32 and terminating in a square end portion 60 (FIG. 2). The tab 58 is maintained in closely fitting relationship with the sides of the slot 32 to prevent lateral motion of the jaw 24 relative to the block 26 and the body 12. However, the tab 58 is free to pivot in the slot 32 around a small annular portion 62 of a pivot pin 64, the pin extending throught a hole 66 in the tab 58 and aligned holes 67 in the block 26. A T-shaped pin 68 (FIGS. 1 and 3) abuts the square end 60 of the tab 58, being urged thereagainst by a heavy spring 70, the shank of the pin 68 and the spring 70 being located in a recess 72 of the guiding and supporting block 26.

When one of the jaws 24 is tightened against a work piece, it is maintained in a radial position or in axial alignment with the block 26 by means of the T-shaped pin 68, which is urged against the square end 60 of the tab 58. However, the spring 70, urging the pin 68 inwardly toward the center of the chuck can yield and enable the jaw 24 to pivot slightly around the pivot pin 64 when sufficient torque is applied on the work piece, to provide a better bite on it. When the jaw 24 is to be replaced, the tab 58 and the jaw 24 are pushed outwardly, away from the center of the chuck, so that the hole 66 is brought into alignment with the connecting pin 64. A tapered tool can then be inserted in an access hole 74 to push the pin 64 out of the holes 66 and 67 and thereby release the jaw 24.

Various modifications of the above described embodiment of the invention will be apparent to those skilled in the art and it is to be understood that such modifications can be employed without departing from the scope of the invention, if within the spirit and tenor of the accompanying claims.

I claim:

1. In a chuck, a jaw assembly comprising a supporting and guiding block of generally cylindrical shape, a slot across one end of said cylindrical block and extending a substantial distance toward the other end thereof, a jaw having a tab with a square end extending into said slot, said tab having an opening therein, said cylindrical block having aligned openings through portions on each side of said slot, a connecting pin located in the openings in said block and said tab, the portion of said pin extending through said tab opening being of smaller diameter than remaining portions of said pin, said block having a recess located centrally therein beyond said slot, a flat headed pin having a shank extending into said recess, and a spring in said recess urging said shank toward a center of the chuck, the head of said pin abutting the square end of said tab to maintain said tab and said jaw in axial alignment with respect to said block.

2. In a chuck, a jaw assembly comprising a supporting and guiding block, said block forming slot means at one end thereof, a jaw having a tab extending into said slot, said tab having an opening therein, said block having aligned openings through portions on each side of said slot, a connecting pin located in the openings of said block and said tab, the portion of said pin extending through said tab opening being of substantially smaller diameter than said tab opening, said block having a recess located centrally therein beyond said slot, a pin extending into said recess, and a spring in said recess urging said pin outwardly against a portion of said tab to yieldably maintain said tab and said jaw in axial alignment with respect to said block.

3. In a chuck, a jaw assembly comprising a supporting and guiding block with a slot at one end thereof, jaw means including a portion extending into said slot, said portion and said block having aligned openings therein, a connecting pin located in said openings of said block and said portion, said pin cooperating with said portion to hold said pin in said openings, and means in said block for urging said portion and said jaw out of said slot, and for urging said jaw into axial alignment with said block.

4. In a chuck, a jaw assembly comprising a supporting and guiding block with a slot at one end thereof a jaw including a portion extending into said slot, means held by said block and extending through said jaw portion for pivotally connecting said jaw to said block, and spring means in said block beyond said slot for contacting said jaw portion and yieldably maintaining said jaw in a fixed position with respect to said slot.

5. In a chuck, a chuck body having a center opening therein, a plurality of cylindrical supporting and guiding blocks including a plurality of arcuate grooves in sides of said blocks, a scroll plate engaged in said grooves and being rotatable in said housing to drive said blocks inwardly and outwardly with respect to said center opening, a jaw pivotally connected to the inner end of each of said blocks, said jaws being movable into said center opening, said arcuate grooves being spaced from said jaws a sufficient distance so as not to extend into said opening during normal movement of said bodies and said jaws, and means for yieldably urging said scroll plate against said bodies to prevent rotation thereof.

References Cited in the file of this patent

UNITED STATES PATENTS

| | | |
|---|---|---|
| 2,690,915 | Pealer | Oct. 5, 1954 |
| 2,787,471 | Retz | Apr. 2, 1957 |
| 2,926,922 | Vermette | Mar. 1, 1960 |